(12) United States Patent
Steele et al.

(10) Patent No.: US 8,913,762 B2
(45) Date of Patent: Dec. 16, 2014

(54) CAPACITIVE TRANSDUCER CIRCUIT AND METHOD

(75) Inventors: Colin Findlay Steele, Edinburgh (GB); Goran Stojanovic, Dunfermline (GB); John Paul Lesso, Edinburgh (GB)

(73) Assignee: Wolfson Microelectronics Ltd., Edinburgh (GB)

( * ) Notice: Subject to any disclaimer, the term of this patent is extended or adjusted under 35 U.S.C. 154(b) by 771 days.

(21) Appl. No.: 12/812,390

(22) PCT Filed: May 7, 2009

(86) PCT No.: PCT/GB2009/050476
§ 371 (c)(1),
(2), (4) Date: Aug. 27, 2010

(87) PCT Pub. No.: WO2009/136198
PCT Pub. Date: Nov. 12, 2009

(65) Prior Publication Data
US 2010/0315272 A1  Dec. 16, 2010

(30) Foreign Application Priority Data

May 7, 2008  (GB) .................................. 0808292.7

(51) Int. Cl.
| | | |
|---|---|---|
| H03M 1/00 | (2006.01) | |
| G01D 3/032 | (2006.01) | |
| G01D 5/24 | (2006.01) | |
| H04R 3/00 | (2006.01) | |
| H04R 19/00 | (2006.01) | |
| H04R 19/04 | (2006.01) | |

(52) U.S. Cl.
CPC .. G01D 5/24 (2013.01); H04R 3/00 (2013.01); H04R 19/005 (2013.01); H04R 19/04 (2013.01); G01D 3/032 (2013.01)
USPC .......................................... 381/111; 341/110

(58) Field of Classification Search
USPC .......................................... 381/111, 113, 174
See application file for complete search history.

(56) References Cited

U.S. PATENT DOCUMENTS

| | | | |
|---|---|---|---|
| 6,285,769 B1 * | 9/2001 | Edelson et al. ................. | 381/95 |
| 7,301,352 B1 | 11/2007 | Sarma | |
| 2003/0025983 A1 | 2/2003 | Lasalandra et al. | |

(Continued)

FOREIGN PATENT DOCUMENTS

| | | |
|---|---|---|
| JP | 57-207817 A | 12/1982 |
| JP | 2006-229336 A | 8/2006 |
| WO | WO 02/03747 A2 | 1/2002 |
| WO | WO 2006/130828 A2 | 12/2006 |

*Primary Examiner* — Duc Nguyen
*Assistant Examiner* — Phan Le
(74) *Attorney, Agent, or Firm* — Dickstein Shapiro LLP

(57) ABSTRACT

A capacitive transducer circuit comprises a capacitive transducer having first and second electrodes. The first and second electrodes are biased by respective first and second bias voltages. An amplifier is connected to receive a first analog signal on an input terminal, the first analog signal being generated by the capacitive transducer, and to generate a second analog signal on an output terminal. A digital feedback circuit is connected between the output terminal of the amplifier and the input terminal of the amplifier. The digital feedback circuit is configured to provide one of said first or second bias voltages. The output of a voltage source which provides the other bias voltage for the capacitive transducer may be filtered by a low pass filter. The low pass filter may comprise a switched capacitor filter circuit.

52 Claims, 5 Drawing Sheets

(56) References Cited

U.S. PATENT DOCUMENTS

| | | | |
|---|---|---|---|
| 2005/0231873 A1* | 10/2005 | Nell | 361/92 |
| 2006/0008097 A1* | 1/2006 | Stenberg et al. | 381/113 |
| 2007/0160234 A1* | 7/2007 | Deruginsky et al. | 381/113 |
| 2007/0297623 A1* | 12/2007 | Kuiri | 381/113 |
| 2009/0003629 A1* | 1/2009 | Shajaan et al. | 381/113 |
| 2010/0013501 A1* | 1/2010 | Van Den Boom | 324/679 |

* cited by examiner

CAPACITIVE TRANSDUCER CIRCUIT AND METHOD

FIELD OF THE INVENTION

This invention relates to a capacitive transducer circuit and to a method of biasing a capacitive transducer, and in particular, but not exclusively, to a MEMS capacitive transducer such as a MEMS microphone.

BACKGROUND OF THE INVENTION

FIG. 1 shows a capacitive transducer 3 comprising a first electrode that is biased to a first bias voltage V1 supplied by a voltage source 5, and a second electrode that is connected to a node 7 biased to a second bias voltage V2' via a high resistance 4. The voltage $V_{outT}$ on node 7 is input to an amplifier 9, which outputs a corresponding voltage $V_{outA}$ on an output terminal 11.

The transducer is designed so that its capacitance changes according to some input stimulus. For example, transducer 3 may be a MEMS microphone, where one electrode is fixed, and the other one moves in response to the pressure waves of incident sound. Since the capacitive transducer is arranged to drive into a high impedance on node 7, the charge on the capacitor does not change significantly. Therefore, the change in the capacitance of the transducer due to the stimulus results in a change ΔV in the voltage across the transducer capacitance.

This transducer signal component ΔV is proportional to the relative change in capacitance of the transducer 3. It is also proportional to the charge stored on the capacitor, and so is proportional to the applied bias V1-V2'. Typically ΔV is only a few millivolts for normal audio signals from a MEMS microphone, since the electrode displacement is only small and there are practical limits to the applied bias voltage across the transducer for both the sensor and the voltage supply. Typically, the bias voltage V2' will be near ground, and the bias voltage V1 about 12V.

The voltage source 5 may be a capacitive charge pump, for example, since the bias voltage V1 may be higher than any external voltage $V_{IN}$ supplied to the system; it may also be other circuitry such as an inductive DC-DC converter, and it may comprise a linear regulator, perhaps fed using a bandgap reference circuit to act as a reference voltage. Each of these sources will present some thermal noise at their output. However, any noise voltage on the bias voltage V1 output from the voltage source 5 will be indistinguishable from the small transducer signal ΔV mentioned above. Thus, it is preferable that the voltage source 5 is designed to inject minimal noise in the signal band.

The DC bias V2' of the other transducer terminal at node 7, coupled to the input of the amplifier 9, is defined by a bias voltage V2 and a series resistance 4. V2' will usually be near to ground in order to maximise the voltage across the transducer element. It is also preferable that the circuitry providing this bias does not inject any appreciable noise into the system.

It will be appreciated from inspection of FIG. 1 that the transducer signal ΔV will appear on node 7, high-pass filtered by the transducer capacitance and the bias resistance 4. A typical MEMS microphone will have a capacitance of the order of only 1 pf. Thus, to provide a −3 dB corner frequency of 20 Hz requires a bias resistance of approximately 8 GΩ. Such high value resistance is difficult to implement accurately as an actual resistor, and therefore the resistance 4 may be obtained by using a diode near the origin of its I-V characteristic. However, it is still difficult to define such a high resistance accurately, so the corner frequency, and possibly the start-up time, of such transducer circuitry is difficult to predict or to maintain in volume production. To guarantee a minimum value of 8 GΩ the typical value may have to be much higher, for example 25 GΩ to 80 GΩ, or even higher.

Also, it is preferable that the amplifier 9 used to pick up the signal $V_{outT}$ from the capacitive transducer 3 has a higher input resistance than the (minimum) value of resistance 4, as must any additional circuitry attached to node 7.

Furthermore, the amplifier 9 must also have an input capacitance substantially lower than the transducer capacitance in order to avoid attenuating the small change in voltage ΔV generated by the movement of the membrane. Any other circuitry attached to node 7 must also present only a small capacitance.

In practical implementations of the circuit shown in FIG. 1, there may be leakage currents onto node 7. For example, a leakage current $I_L$ can flow across the terminals of the biased transducer 3. Such leakage currents $I_L$ will alter the current through resistance 4, thus creating an error in the output signal $V_{outT}$ from the capacitive transducer 3, and hence the analogue output signal $V_{outA}$. For example, if resistance 4 is 80 GΩ, even 100 fA of leakage will give rise to a DC offset of 8 mV, which is comparable with a normal peak audio signal. This DC offset voltage may disturb the operating point of the amplifier and thus degrade its linearity, or give an objectionable effect downstream such as reducing the available dynamic range of downstream circuitry, such as gain amplifiers or an ADC.

It will be appreciated by those skilled in the art that $V_{outT}$=V2'+/−ΔV where V2' represents the DC (bias) voltage and $V_{outT}$ represents the AC (signal) voltage.

An aim of the present invention is to provide an operatively biased capacitive transducer circuit, and a method of biasing a capacitive transducer, which provides a predictable DC output voltage (and hence corner frequency) with low added noise, despite the high resistance and low capacitance required at node 7.

SUMMARY OF THE INVENTION

According to a first aspect of the invention, there is provided a capacitive transducer circuit comprising: a capacitive transducer comprising first and second electrodes, wherein the first and second electrodes are biased by respective first and second bias voltages, and wherein the capacitive transducer generates a first analogue signal; an amplifier connected to receive the first analogue signal on an input terminal and generate a second analogue signal on an output terminal; and a digital feedback circuit connected between the output terminal of the amplifier and the input terminal of the amplifier, wherein the digital feedback circuit is configured to control one of said first or second bias voltages.

According to another aspect of the invention, there is provided a method of operatively biasing a capacitive transducer circuit, the method comprising the steps of: providing a capacitive transducer comprising first and second electrodes, wherein the first and second electrodes are biased by respective first and second bias voltages, and wherein the capacitive transducer generates a first analogue signal; providing an amplifier connected to receive the first analogue signal on an input terminal and generate a second analogue signal on an output terminal; and providing a digital feedback circuit between the output terminal of the amplifier and the input terminal of the amplifier, wherein the digital feedback circuit is configured to control one of said first or second bias voltages.

BRIEF DESCRIPTION OF THE DRAWINGS

For a better understanding of the invention, and to show more clearly how it may be carried into effect, reference will now be made, by way of example only, to the accompanying drawings in which:

FIG. 5b shows an equivalent electrical circuit relating to FIG. 5a.

DETAILED DESCRIPTION OF THE PREFERRED EMBODIMENT

Figure 1:
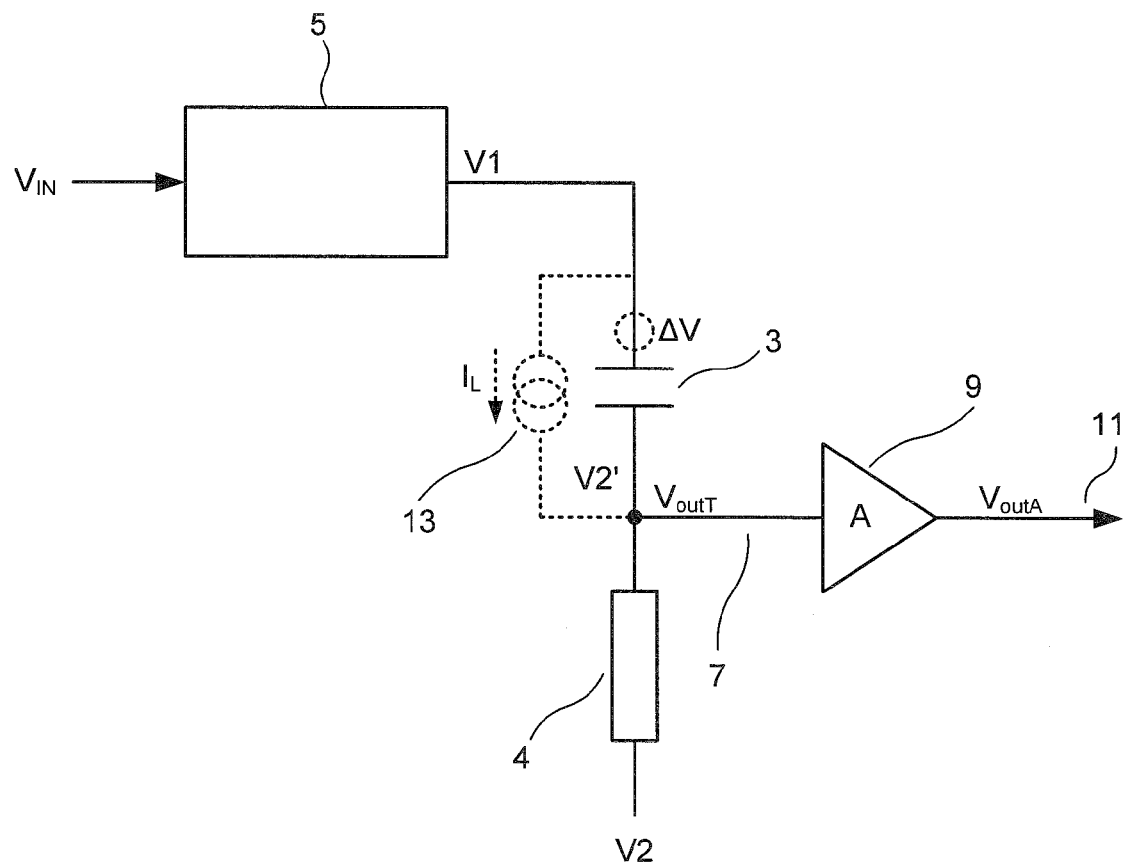
FIG. 1 shows a conventional circuit incorporating a capacitive transducer.

As described above, FIG. 1 shows a capacitive transducer 3 comprising a first electrode that is biased to a first bias voltage V1 supplied by a voltage source 5, and a second electrode that is connected to a node 7, the second electrode being biased to a second bias voltage V2' via a high resistance 4. The voltage $V_{outT}$ on node 7 is input to an amplifier 9, which outputs a corresponding voltage $V_{outA}$ on an output terminal 11.

It is possible that significant and unpredictable leakage currents, for example as shown by $I_L$, can appear on node 7. These, imposed on the high and variable resistance 4, result in a variable and significant offset and variability in the quiescent bias voltage of node 7. This variable offset may disturb the operating point of the amplifier and thus degrade its linearity, for instance causing the amplifier output to clip prematurely or to introduce distortion as its output approaches ground. It may also reduce the available dynamic range of downstream circuitry such as gain amplifiers or an ADC. In a microphone application, it may also introduce pops and clicks, when switching on and off or between channels, or when adjusting gain downstream.

Figure 2:
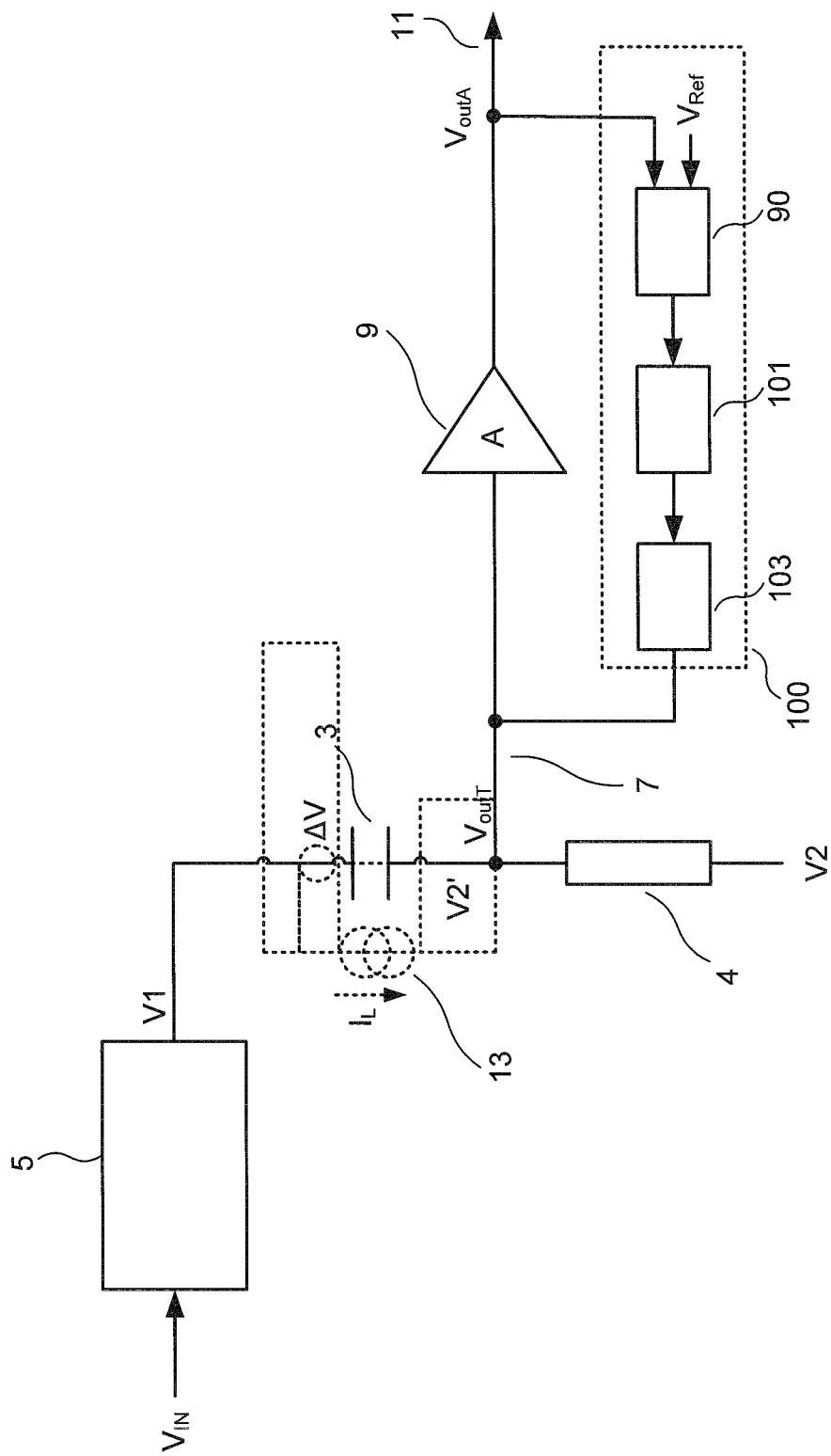
FIG. 2 shows a circuit according to the present invention, comprising a capacitive transducer having a DC servo loop according to a first aspect of the present invention.

FIG. 2 shows a capacitive transducer circuit according to a first aspect of the present invention. This circuit diagram includes components as shown in FIG. 1, with like components numbered correspondingly. According to the invention, the capacitive transducer circuit also comprises a feedback circuit 100 connected between the output terminal 11 of the amplifier 9 and its input terminal 7.

The feedback circuit 100 is arranged to compare the amplifier output $V_{outA}$ with a target output bias voltage $V_{REF}$ and to feed back a corresponding current onto node 7. Provided there is enough gain around the loop comprising feedback circuit 100 and amplifier 9, this will result in the output voltage $V_{outA}$ settling to a voltage equal to $V_{REF}$. Except for minor effects such as the possible small input offset voltage of amplifier 9, this will also define the voltage at node 7, independent of any leakage current 13.

The choice of DC reference voltage $V_{REF}$ will depend on system requirements. For example, in a system where the maximum (overload) output that must be handled without clipping is say +/−200 mV at the output of amplifier 9, then a reference voltage $V_{REF}$ of 200 mV+10%, for example, as headroom may be a suitable choice. This will allow the amplifier 9 to suitably drive the output signal $V_{outA}$ above ground without clipping. The amplifier 9 may be a unity-gain follower. The amplifier 9 may alternatively be a gain stage in which case $V_{REF}$ may be chosen such that it is, for example, 400 mV so that the quiescent voltage (V2') on node 7 is also 400 mV, which will allow for the gain stage and any potential overload. Having a suitable amount of headroom avoids the amplifier input swinging below ground, avoiding the need for an amplifier with a common-mode input range spanning below ground, while only reducing the voltage across the transducer capacitance from 12V to (12V-$V_{REF}$) (i.e 11.6V for $V_{REF}$=400 mV). The choice of 400 mV for the input bias is also convenient in providing headroom for the output of the current-output DAC 103 of the feedback circuit 100. For other requirements or technological restrictions, a different choice of DC reference voltage $V_{REF}$ may be preferred.

The design of the feedback circuit 100 poses several problems. In use, high-amplitude signals may appear at the output of amplifier 9. If these high-amplitude signals pass through from node 11 to node 7, the output audio band signal will be attenuated by this negative feedback. Also, any distortion in the signal as it passes though the feedback circuit 100 may cause harmonics to be introduced, or result in asymmetric rectification of the fed-back audio signal resulting in a signal-dependent offset. Also, the output stage of the feedback circuit 100 must not introduce appreciable noise onto node 7, as this would add noise to the output signal. Furthermore, the output stage of the feedback circuit 100 must not degrade the low-frequency resistance of node 7, nor add appreciable capacitance to node 7.

In a steady state, the current output from feedback circuit 100 will settle to a value that cancels out the net effect of leakage current $I_L$ and the small current necessary to impose the desired voltage (possibly zero) across the high value resistance 4. The leakage current to be cancelled may range from a few femtoamperes to say 100 pA. The total audio-band noise budget of say 4 uV on a 1 pf sensor is equivalent to 4 aC, i.e. some 25 electrons. The value of resistance 4 as discussed above will be at least 8 GΩ, probably higher. The lower cut-off frequency required from the microphone output may be as low as 20 Hz, which is difficult to achieve with integrated analogue circuitry, especially at these low noise levels.

According to the embodiment illustrated in FIG. 2, the feedback circuit 100 comprises an analogue-to-digital converter (ADC) 90 for converting the analogue signal $V_{outA}$ from the output 11 of the amplifier 9 into a digital signal. A digital filter 101, for example an integrator, receives the output of the ADC 90. The output of the digital filter 101 is connected to a current-output digital-to-analogue converter (IDAC) 103, the output current $I_E$ of which is fed back to the input of the amplifier 9.

A suitable choice for the architecture of ADC 90 is a 1-bit sigma-delta modulator. This is naturally a high sample rate, mitigating anti-aliasing issues, and is a simple structure. The output of a 1-bit sigma-delta modulator will be heavily filtered, so audio-band quantisation noise can be tolerated. However, it is noted that multi-bit delta-sigma modulators, or other architectures or forms of ADC are possible.

The digital filter 101 is configured such that the feedback circuit 100 only affects frequencies below the audio band, for example audio signals below 20 Hz. Signals at 20 Hz and above are heavily attenuated by this filter. Thus, the stages following the digital filter 101 need handle only the low-frequency low-amplitude offset signals, rather than having to handle voice-band signals with enough resolution to avoid the above-mentioned harmonic distortion or rectification effects.

For example, the digital filter 101 may be an integrator that adds up the stream of digitised output samples from the ADC 90, thereby acting as a filter. For a 1-bit ΣΔ ADC, the integrator reduces to a simple up-down counter. The use of a digital filter 101 enables easier realisation of such low frequency time constants, without requiring unfeasibly high resistor or capacitor values as would be required in an analogue solution, especially an integrated circuit implementation.

In addition to the requirement to substantially filter out any audio-band signal, the digital filter 101 will generally have a very-low frequency response to maintain loop stability. There are many poles and delays around the loop, including the finite bandwidth of amplifier 9, the delay through the ADC, and the somewhat variable pole introduced by the IDAC 103 feeding into the transducer capacitance 3 and the bias resistance 4. The digital filter 101 may provide the dominant low frequency pole of the loop, and so may have a sub-Hz pole.

The use of a digital filter 101 rather than an analogue network has the advantage of enabling the poles in the feedback loop to be controlled more accurately and easily, for example by choice of filter length and scaling. Also, if a more complex frequency compensation loop is required, this may be achieved relatively easily with a digital rather than analogue solution.

Figure 3:
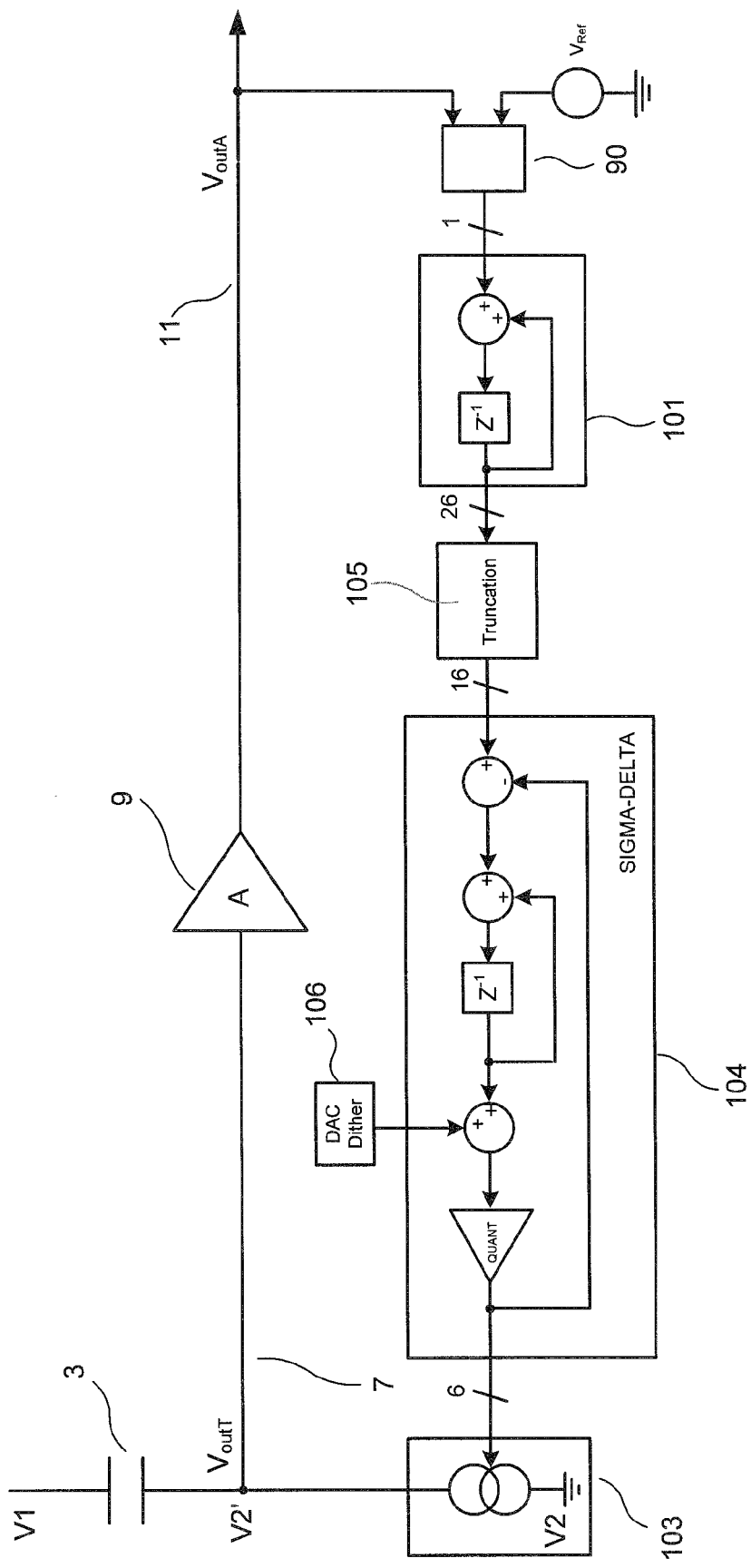
FIG. 3 shows a further embodiment of the present invention.

However, the realisation of time constants for sub-audio, or even sub-Hz filter poles, with a digital filter receiving data at perhaps 2.4 MHz from the sigma-delta ADC 90, inherently results in a long filter word-length, for example that from a 26-bit counter. In principle, this 26-bit word could be passed directly to a 26-bit IDAC 103, but such a DAC is not practical. It is preferable to reduce the number of bits passed to the DAC 103, for example using measures discussed below According to another embodiment as shown in FIG. 3, the feedback circuit 100 may comprise an ADC 90, digital filter 101 and IDAC 103 as shown in FIG. 2. However, according to the embodiment of FIG. 3, the feedback circuit 100 further advantageously comprises a truncation block 105 for truncating the number of bits taken from the digital filter 101. For example, if the digital filter is realised using a 26-bit counter, the truncation block 105 can be configured to omit a predetermined number of upper bits, for example the upper, i.e. most significant, ten bits of the counter, since these are unlikely to be used, except in gross overload conditions, where truncation block 105 is arranged to output a maximum signal, i.e. to clip rather than roll over. As such, the truncation block 105 is configured to output a 16-bit signal in the example provided. It will be appreciated that the counter may be configured to output any number of bits "n", while the truncation block can be configured to truncate the n-bits to m-bits, where m is less than n.

The embodiment of FIG. 3 may also comprise a wordlength-reduction block 104 for reducing further the number of bits supplied to the IDAC 103. Simple truncation of further upper bits would limit the range, while simple truncation of lower bits would introduce too much quantisation noise. However, a lower-bit bit-reduction circuit that does not introduce significant quantisation noise in the audio-band, albeit introducing quantisation noise at higher frequencies is acceptable, bearing in mind that the current DAC 103 feeding into the transducer capacitance will act as a low-pass postfilter. For example, the word-length-reduction block 104 may comprise a sigma-delta modulator, as will be known to a person skilled in the art. The use of a word-length-reduction block 104 enables a less complex current DAC 103 to be used, which in turn reduces cost. In the example provided the wordlength-reduction block 104 is shown as reducing the 16-bit input signal to a 6-bit output signal. It will be appreciated, however, that the word length reduction block can be configured to receive any number of bits "x", and output any number of bits "y", where y is less than x.

According to a further aspect of the invention, the wordlength-reduction block 104 may be adapted such that dither 106 is applied to the word-length-reduction operation, thereby removing any unwanted effects caused by harmonics or possible idle tones.

To ensure that the digital filter provides the dominant pole in the loop, the loop bandwidth may need to be placed below the worst-case (minimum) corner frequency of the input node 7. It is possible that drift of the leakage current with temperature or ambient humidity will often occur over a long time scale, so this is usually acceptable. However, balanced with this very low cut-off frequency requirement is a need for the feedback circuit 100 to react as quickly as possible during certain conditions, such as start-up for example. The digital filter 101 may therefore be configured to have a different time constant (i.e. bandwidth) during said certain conditions. For example, the digital filter 101 may be provided with a variable gain facility that allows the digital filter 101 to react more quickly during start-up and return to a point of convergence, whereby the error voltage $V_{ERR}$ input to the feedback circuit 100 as a whole tends to zero much more quickly than if the digital filter 101 was allowed to count up or down with a step-size of one.

In addition, the digital filter 101 can be adapted to react to sudden changes. For example, an extreme pressure wave, for example dropping the microphone on the floor or slamming a car door, may result in a persistent change in bias conditions on the input. This may be detected, for example, by detecting when a large number of consecutive 1's or 0's is received from the ADC 90. The time constant, i.e. bandwidth, of the digital filter 101 may therefore be changed in such a situation, for example by changing the step-size of the count, so that the feedback circuit 100 settles more quickly following the sudden change. As such, the digital filter 101 may be configured to have a first bandwidth during a first mode of operation, and a second bandwidth during a second mode of operation. The first mode of operation may be a playback mode of operation. The second mode of operation may be a start-up mode of operation or a sudden change in operation.

Figure 4:
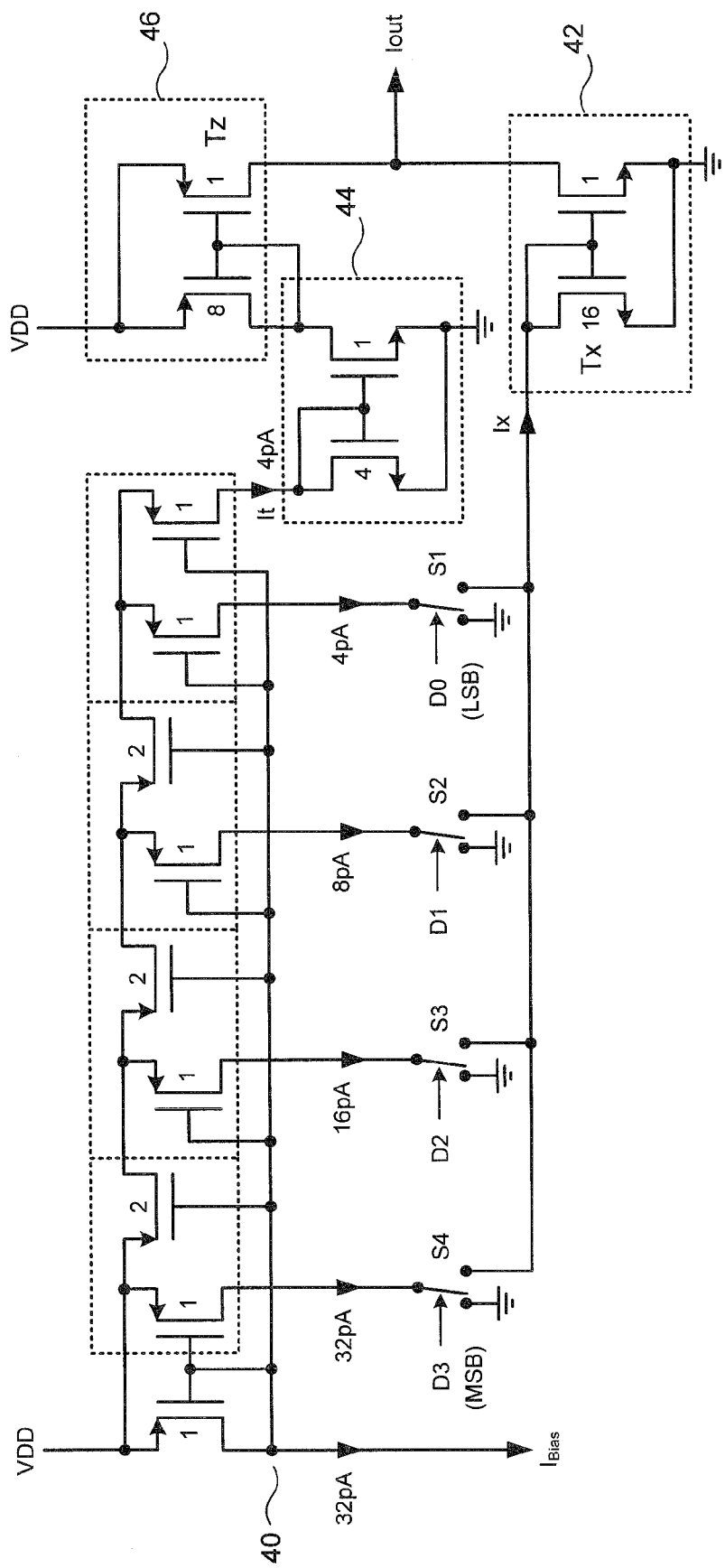
FIG. 4 shows an example of a current DAC for use with the circuit of FIG. 2 or FIG. 3.

The IDAC 103 can be a conventional current-steering structure, for example based on a sub-threshold MOS R-2R ladder as shown (as a 4-bit IDAC) in FIG. 4. The example shown in FIG. 4 comprises an input PMOS, a 4-bit MOS R-2R ladder with multiple outputs, a bank of two-way switches connected to respective outputs, and three ratioed current mirrors. It will be appreciated by those skilled in the art that the numbers associated with the various PMOS & NMOS transistors of FIG. 4 reflect their respective aspect ratios W/L.

In operation a bias current $I_{Bias}$, say 32 pA is applied to (i.e. sunk from) terminal 40. The MOS R-2R ladder replicates and scales this bias current $I_{Bias}$ by binary division at each ladder node to deliver a set of binary weighted currents of 32 pA, 16 pA, 8 pA, and 4 pA to the respective switches S4-S1. Depending on the state of a respective input data bit D0-D3, each respective switch S1-S4 either discards its respective current to ground or applies it as a component of the input current of mirror input device 42. Thus, mirror device 42 receives a current Ix between zero and 15*4 pA=60 pA in 4 pA steps, according to the state of the switches S1-S4, i.e. according to the input word comprised of the respective input data bits D0-D3. This current Ix is scaled by the ratio of the NMOS transistors (equal to 16 in this example) in this current mirror 42 to give an output current Iout between a minimum of zero and a maximum of 3.75 pA (i.e. 60 pA/16) in 0.25 pA steps (i.e. 4 pA/16). The 4 pA termination current It of the ladder is also scaled by a factor of 32 by the two current mirrors 44 & 46, i.e 4:1×8:1, to give a constant source current of 0.125 pA (i.e. 4 pA/32).

Thus, the net output current of the IDAC 103 shown in FIG. 4 can be varied from −0.125 pA to +3.625 pA in 0.25 pA steps.

A similar 6-bit design could give a maximum current of about four times this value, i.e. nearly 15 pA. If desired, an extra control bit could be derived and used to pulse the small source current, to avoid any small thermal noise that may be generated due to the IDAC 103, i.e transistor Tz, being always on.

For large signals, i.e. to compensate for gross leakage up to say 15 pA, all of these 6-bits are exercised. It is noted that the output from sigma-delta modulator 104 is noise-shaped, such that quantisation noise in the audio band is suppressed. For small signals, to compensate for sub-pA leakage, as is more likely in normal operational conditions, only the LSB toggles, which means that the sigma-delta modulator 104 becomes essentially a 1-bit sigma-delta modulator. For example, a very small leakage current of 2.5 fA can be compensated for by a 0.25 pA pulse every 100 cycles: at a sample rate of 2.4 MHz, this is related to a base frequency of some 24 kHz, above audible frequency range. The quantisation noise is still noise-shaped, avoiding audio-band noise and artefacts, the timing between these pulses being modulated suitably by the sigma-delta modulator 104. Furthermore, any audio-band noise will be attenuated by the integrating effect of the transducer capacitance.

Also, the output current $I_{out}$ of the IDAC 103 may be increased by switching out elements of the mirror input devices to alter the respective ratios. For example, referring to FIG. 4, if the 15 of 16 parts of the 16× mirror input transistor Tx are turned off, so this mirror effectively becomes a 1:1 mirror rather than 1:16, then the maximum current (and the LSB) will be increased by 16.

Thus far, it has been assumed that the ADC 90 serves only to provide an output signal for the feedback path, while the amplified output signal $V_{outA}$ is passed to external circuitry. However, there is also the requirement for a "digital microphone" where a digital representation of the transducer signal is required. One convention is to output a single-bit output stream, quantised using a $4^{th}$ order delta-sigma modulator. In such a case, such a modulator is interposed between $V_{outA}$ and the external terminal of the microphone assembly. Therefore, according to another embodiment of the present invention, rather than using a distinct ADC 90, the output of a higher-performance ADC provided for other reasons may be used instead. In other words, ADC 90 of the feedback circuit 100 may be a high performance $4^{th}$ order delta-sigma modulator, the output of which is transmitted to the external world in addition to being used in the feedback circuit 100.

Figure 5A:
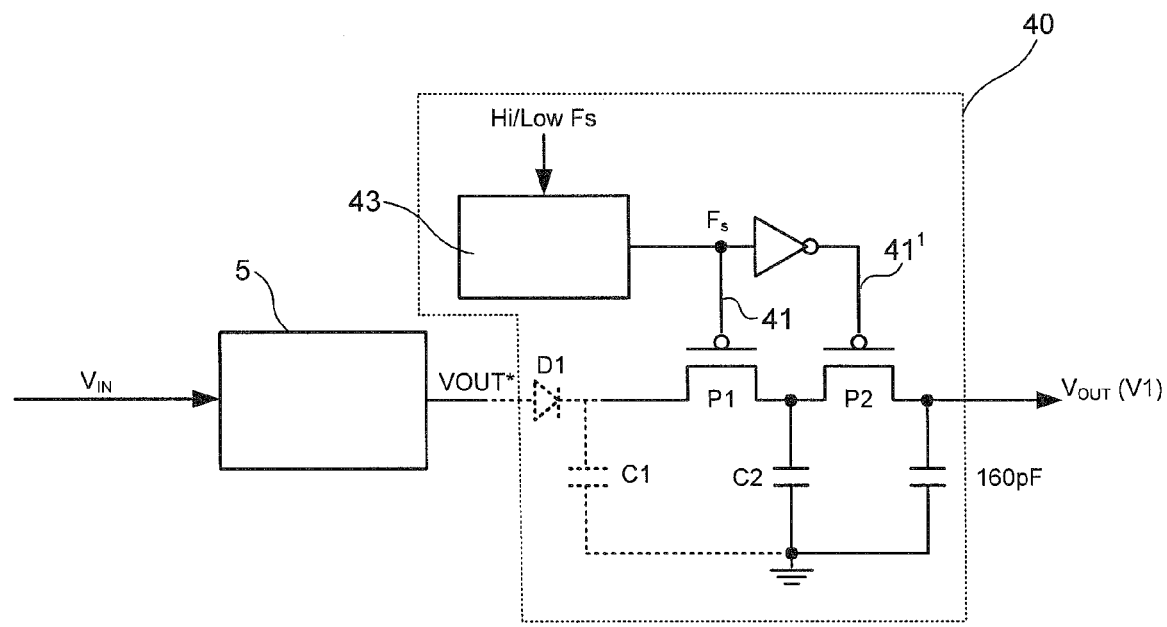
FIG. 5a shows a circuit according to another aspect of the invention.

According to another aspect of the invention, FIG. 5a shows a circuit for providing a clean bias voltage to the capacitive transducer 3. A DC voltage source 5, for example a capacitive charge pump, generates a voltage $V_{OUT}{}^*$. A DC voltage source 5 realised as a capacitive charge pump may comprise a series of charge pump stages. Typically, a charge pump will "gain-up" thermal noise on its input by a similar gain factor as the step-up factor of the charge pump (e.g. by a factor of 10 for a charge pump which steps up from 1.2V to 12V). The input voltage $V_{IN}$ to the voltage source 5 may be pre-regulated by a regulator, which will have its own thermal noise, including wide-band noise aliased down by the sampling action of the charge pump input stage. The reference voltage for the regulator may be derived itself from a noisy source, for example a bandgap reference. It is noted that bandgap references are inherently noisy, as their output voltage inherently includes a component equivalent to a small $\Delta V_{be}$ voltage that has been multiplied. Therefore, it is possible to have noise injected from a number of different stages in a power supply/regulation system that may be amplified from one stage to another.

For many circuits, this thermal noise is unimportant, as it appears only on amplifier supply voltages, and is attenuated by the amplifier power supply rejection before appearing on any signal path. In this application, however, any noise on VOUT* may be indistinguishable from the transducer signal $\Delta V$, so must be preferably reduced as much as possible, for example to a sub-microvolt level.

Figure 5B:
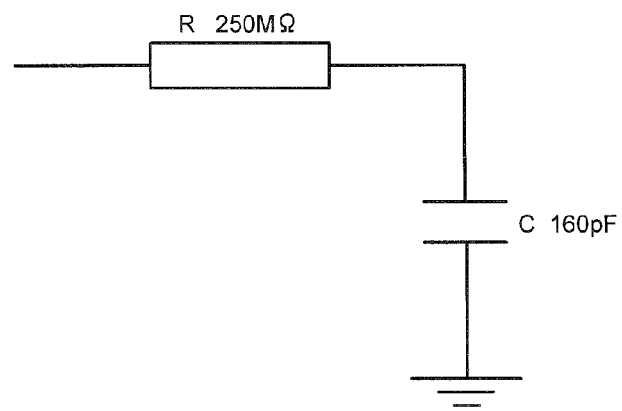

Thus, according to this aspect of the invention, the output of the DC voltage source 5 is passed through a low pass filter circuit 40. If implemented as a simple RC filter, as can be seen from FIG. 5b, to achieve the required filter characteristics for an audio signal, the resistance R in FIG. 5b must have a value of around 250 MΩ when used with a capacitor C having a capacitance of 160 pF to give a 4 Hz corner frequency, to provide some attenuation by 20 Hz. However, as will be appreciated by a person skilled in the art, it is difficult to realise a high value accurate resistor such as 250 MΩ, particularly in a CMOS integrated circuit due to physical size constraints and process variations. Therefore, according to this aspect of the invention, a switched capacitor circuit is used to simulate such a high value resistor. For example, switches P1, P2 and capacitor C2 of the low pass filter circuit 40 are used to form the resistance R in the equivalent circuit shown in FIG. 5b. The switches P1 and P2 are switched by complementary switching signals 41, 41' having a switching frequency $F_S$. This has the advantage of providing an effective resistance of about 250 Mb, but without the size constraints associated with a conventional resistor element.

The provision of such a low pass filter circuit 40 for smoothing the output voltage of the DC voltage source 5 poses conflicting problems. On the one hand a low switching frequency $F_S$ is required for the switches P1, P2 so that the value of the capacitor C2 can be made low, such that the capacitor C2 requires less physical space. The effective resistance R is given as:

$$R = 1/F_s C$$

Thus, for a capacitor C2 having a value of 0.1 pF, for example, the switching frequency $F_s$ must be around 40 KHz to give an effective resistance of about 250 MΩ.

It is noted that the DC output impedance of this circuit is about 250 MΩ. Thus, even a 1 nA load will cause a voltage drop across the filter of some 250 mV. Also any impedance from the output to ground comparable with 250 MΩ will alter the time constant of the filter. Thus this technique is not useful for applications where the charge pump has to supply any appreciable output current. However in this application, the charge pump output serves more as a reference voltage than a power supply. The load is less than 100 pA, typically only a few femtoamperes, which means that this novel circuit is well-suited to this application.

The long time constant associated with filter circuit 40 has the disadvantage of providing a very slow start-up phase (or during events such as recovery from overload as discussed above) due to the RC time constant. To overcome this disadvantage, the low pass filter circuit 40 can be switched with a first (high) switching frequency during start-up, and a second (Low) switching frequency during normal operation. For example, a clock generator 43 can be configured and controlled (Hi/Low Fs) to provide a first high frequency output clock signal for switching the switches P1, P2 during start-up, and a second low frequency output clock signal 45 for switching the switches P1, P2 during normal operation.

For example, during start up the clock generator 43 can output a clock signal having a switching frequency $F_S$ of 1 MHz, for example. This results in the resistor R of the equivalent circuit 5b having an effective resistance of 10 MΩ during start-up, giving a time constant of 1.6 ms, settling to 1% in 16 ms. During normal operation the clock generator 43 can be configured to provide an output clock signal 45 having a lower switching frequency $F_S$, for example 40 KHz as mentioned above, thus providing the required 250 MΩ resistance value during normal operation.

This aspect of the invention has the advantage of providing a low pass filter for smoothing the output of the DC voltage source 5 during normal operation, but also having the advantage of a faster start-up response.

It will be appreciated that the various aspects of the invention described above have the advantage of providing an improved capacitive transducer circuit, for example a MEMS capacitive microphone circuit, and overcome the problems associated with biasing the capacitive transducer.

Although the circuit of FIG. 2 has been described in terms of the capacitive transducer 3 being a MEMS capacitive microphone, it will be appreciated that the invention is equally applicable to any form of capacitive transducer. For example a similar accelerometer, or ultrasonic transducer; or a chemical sensor where the capacitance is modulated by a change in dielectric constant of the dielectric between transducer electrodes.

Furthermore, it will be appreciated that the various values used in the discussion of the embodiments (such as the number of bits, current values, voltage values, etc) are provided as examples only, and that other values may be used without departing form the scope of the invention, as defined in the appended claims.

It is noted that the invention may be used in a number of applications. These include, but are not limited to, consumer applications, medical applications, industrial applications and automotive applications. For example, typical consumer applications include laptops, mobile phones, PDAs and personal computers. Typical medical applications include hearing aids. Typical industrial applications include active noise cancellation. Typical automotive applications include hands-free sets, acoustic crash sensors and active noise cancellation.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A capacitive transducer circuit comprising:
    a MEMS capacitive transducer comprising first and second electrodes, wherein the first and second electrodes are biased by respective first and second bias voltages, and wherein the capacitive transducer generates a first analogue signal;
    an amplifier connected to receive the first analogue signal on an input terminal and generate a second analogue signal on an output terminal; and
    a digital feedback circuit connected between the output terminal of the amplifier and the input terminal of the amplifier, wherein the digital feedback circuit is configured to receive the second analogue signal from the output terminal of the amplifier and operatively bias the input terminal of the amplifier, wherein the digital feedback circuit comprises:
        an analogue to digital converter for converting the second analogue signal into a digital signal;
        a digital filter connected to receive the output of the analogue to digital converter, and output a filtered digital signal; and
        a digital to analogue converter connected to receive the filtered digital signal, and control one of said first or second bias voltages.

2. A capacitive transducer circuit as claimed in claim 1, wherein the digital filter receives an input signal having a first number of bits from the analogue to digital converter, and is configured to output a signal having a second number of bits to the digital to analogue converter.

3. A capacitive transducer circuit as claimed in claim 2, wherein the digital filter receives a 1-bit input signal from the analogue to digital converter.

4. A capacitive transducer circuit as claimed in claim 2, wherein the digital filter is configured to have a first bandwidth during a first mode of operation, and a second bandwidth during a second mode of operation.

5. A capacitive transducer circuit as claimed in claim 4, wherein the first mode of operation comprises a playback mode of operation.

6. A capacitive transducer circuit as claimed in claim 4, wherein the second mode of operation comprises a start-up mode of operation or a sudden change in operation.

7. A capacitive transducer circuit as claimed in claim 2, wherein the digital filter comprises an integrator.

8. A capacitive transducer circuit as claimed in claim 7, wherein the integrator comprises an n-bit counter.

9. A capacitive transducer circuit as claimed in claim 1, wherein the digital feedback circuit further comprises a truncation unit provided between the digital filter and the digital to analogue converter, whereby the truncation unit is configured to receive an n-bit signal from the digital filter and output a m-bit signal, whereby m is less than n.

10. A capacitive transducer circuit as claimed in claim 9, wherein the truncation unit is configured to discard the upper n-m bits of the digital signal received from the digital filter.

11. A capacitive transducer circuit as claimed in claim 1, wherein the digital feedback circuit further comprises a word length reduction unit provided between the digital filter and the digital to analogue converter, wherein the word length reduction unit is configured to receive a x-bit signal and output a y-bit signal, whereby y is less than x.

12. A capacitive transducer circuit as claimed in claim 11, wherein the word length reduction unit comprises a sigma-delta modulator.

13. A capacitive transducer circuit as claimed in claim 12, wherein the sigma-delta modulator comprises a dither circuit.

14. A capacitive transducer circuit as claimed in claim 1, wherein the analogue-to-digital converter used in the digital feedback circuit is an analogue-to-digital converter used for providing a separate digital audio output signal.

15. A capacitive transducer circuit as claimed in claim 14, wherein the analogue-to-digital converter comprises a fourth order delta-sigma modulator configured to provide a single-bit output stream.

16. A capacitive transducer circuit as claimed in claim 1, wherein the digital-to-analogue converter used in the digital feedback circuit comprises a current-output digital-to-analogue converter.

17. A capacitive transducer circuit as claimed in claim 16, wherein the digital-to-analogue converter comprises a multi-bit R-2R ladder.

18. A capacitive transducer circuit as claimed in claim 16, wherein the digital-to-analogue converter is configures to operate using a first number of bits during a first mode of operation, and a second number of bits during a second mode of operation.

19. A capacitive transducer circuit as claimed in claim 1, further comprising:
a switching voltage source; and
a low pass filter circuit provided between the switching voltage source and the capacitive transducer, for filtering one of said first or second bias voltages.

20. A capacitive transducer circuit as claimed in claim 19, wherein the low pass filter circuit comprises a switched capacitor filter circuit.

21. A capacitive transducer circuit as claimed in claim 20, wherein the switched capacitor filter circuit is switched at a first clock frequency during a first mode of operation, and a second clock frequency during a second mode of operation.

22. A capacitive transducer circuit as claimed in claim 21, wherein one of said first or second modes comprises a start-up mode.

23. A method of operatively biasing a capacitive transducer circuit, the method comprising the steps of:
providing a MEMS capacitive transducer comprising first and second electrodes, wherein the first and second electrodes are biased by respective first and second bias voltages, and wherein the capacitive transducer generates a first analogue signal;
providing an amplifier connected to receive the first analogue signal on an input terminal and generate a second analogue signal on an output terminal; and
providing a digital feedback circuit between the output terminal of the amplifier and the input terminal of the amplifier, wherein the digital feedback circuit comprises:
an analogue to digital converter for converting the second analogue signal into a digital signal;
a digital filter connected to receive the output of the analogue to digital converter, and output a filtered digital signal; and
a digital to analogue converter connected to receive the filtered digital signal, and control one of said first or second bias voltages
wherein the digital feedback circuit is configured to receive the second analogue signal from the output terminal of the amplifier and operatively bias the input terminal of the amplifier.

24. A method as claimed in claim 23, further comprising the steps of:
providing an analogue to digital converter for converting the second analogue signal into a digital signal;
providing a digital filter connected to receive the output of the analogue to digital converter, and output a filtered digital signal; and
providing a digital to analogue converter connected to receive the filtered digital signal, and control one of said first or second bias voltages.

25. A method as claimed in claim 24, wherein the digital filter receives a first number of bits from the analogue to digital converter, and outputs a signal having a second number of bits to the digital to analogue converter.

26. A method as claimed in claim 25, wherein the digital filter receives a 1-bit input signal from the analogue to digital converter.

27. A method as claimed in claim 25, wherein the digital filter is operated with a first bandwidth during a first mode of operation, and a second bandwidth during a second mode of operation.

28. A method as claimed in claim 27, wherein the first mode of operation comprises a playback mode of operation.

29. A method as claimed in claim 27, wherein the second mode of operation comprises a start-up mode of operation or a sudden change in operation.

30. A method as claimed in claim 24, wherein the digital filter comprises an integrator.

31. A method as claimed in claim 30, wherein the integrator comprises an n-bit counter.

32. A method as claimed in claim 24, further comprising the step of providing a truncation unit between the digital filter and the digital to analogue converter, wherein the truncation unit receives an n-bit signal from the digital filter and is operated to output a m-bit signal, whereby m is less than n.

33. A method as claimed in claim 32, further comprising the step of discarding the upper n-m bits of the digital signal received from the digital filter.

34. A method as claimed in claim 24, further comprising the step of providing a word length reduction unit in the digital feedback circuit between the digital filter and the digital to analogue converter, wherein the word length reduction unit is configured to receive a x-bit signal and output a y-bit signal, whereby y is less than x.

35. A method as claimed in claim 34, wherein the word length reduction unit comprises a sigma-delta modulator.

36. A method as claimed in claim 35, further comprising the step of dithering the operation of the sigma-delta modulator.

37. A method as claimed in claim 24, wherein the analogue-to-digital converter used in the digital feedback circuit is an analogue-to-digital converter used for providing a separate digital audio output signal.

38. A method as claimed in claim 37, wherein the analogue-to-digital converter comprises a fourth order delta-sigma modulator operated to provide a single-bit output stream.

39. A method of operatively biasing a capacitive transducer circuit as claimed in claim 23, wherein the method further comprises the steps of:
providing a low pass filter circuit between a switching voltage source and the capacitive transducer.

40. A method as claimed in claim 39, wherein the step of providing a low pass filter comprises the step of providing a switched capacitor filter circuit.

41. A method as claimed in claim 40, further comprising the step of switching the switched capacitor filter circuit at a first clock frequency during a first mode of operation, and a second clock frequency during a second mode of operation.

42. A method as claimed in claim 41, wherein one of said first or second modes comprises a start-up mode.

43. An electronic device comprising a capacitive transducer circuit as claimed in claim 1.

44. A communications device comprising a capacitive transducer circuit as claimed in claim 1.

45. A portable telephone device comprising a capacitive transducer circuit as claimed in claim 1.

46. An audio device comprising a capacitive transducer circuit as claimed in claim 1.

47. A computer device comprising a capacitive transducer circuit as claimed in claim 1.

48. A vehicle comprising a capacitive transducer circuit as claimed in claim 1.

49. A medical device comprising a capacitive transducer circuit as claimed in claim 1.

50. An industrial device comprising a capacitive transducer circuit as claimed in claim 1.

51. A micro-electrical-mechanical-systems (MEMS) device comprising a capacitive transducer circuit as claimed in claim 1.

52. An integrated circuit comprising a capacitive transducer circuit as claimed in claim 1.

* * * * *